United States Patent Office 3,422,023
Patented Jan. 14, 1969

3,422,023
FLUORESCENT LANTHANIDE CHELATES OF DIBENZOYLAMINE
Marcos Y. Kleinerman, Southbridge, Mass., assignor, by mesne assignments, to American Optical Company, Southbridge, Mass., a corporation of Delaware
No Drawing. Continuation-in-part of application Ser. No. 419,209, Dec. 17, 1964. This application Mar. 17, 1967, Ser. No. 623,827
U.S. Cl. 252—301.2          10 Claims
Int. Cl. C09k 1/00

ABSTRACT OF THE DISCLOSURE

A composition with ligands whose excited energy levels are high enough for achieving energy transfer to a rare earth ion without substantial quenching of the resultant fluorescent emission from the rare earth ion. The desirable fluorescence properties are enabled by lanthanide chelates of dibenzoylamine; $(C_6H_5CO)_2NH$, wherein the ligand ion may be either terbium, europium, samarium, and dysprosium.

---

This is a continuation-in-part of application Ser. No. 419,209, filed Dec. 17, 1964, which, in turn, is a continuation-in-part of Ser. No. 364,022, filed Apr. 30, 1964, both now abandoned.

This invention relates to lanthanide-containing compositions. More particularly, this invention relates to compositions containing a special chelated lanthanide. Still more particularly this invention relates to fluorescent compositions, liquid and/or solid, containing lanthanide ions chelated with a special chelating agent.

It is known that certain lanthanide chelates, such as chelates of the trivalent rare earth ions, e.g. terbium, europium and samarium, exhibit fluorescence and that this property renders such materials of commercial interest, particularly in the field of laser applications and development. In other applications, such as in paints or surface coatings and the like, the property of fluorescence is useful and of interest.

Concerning the spectroscopic properties of lanthanides, since optical excitation of the metal ion can frequently be achieved more readily by energy transfer from an associated ligand than by direct optical excitation of the ion, the potential of lanthanide chelates as laser materials was quickly appreciated. However, the minimum required population inversion for laser oscillation in rare earth chelates requires a high concentration, about $10^{18}$ ions per cc. of the chelate. Unfortunately, the absorptivity of the lanthanide chelates so far considered for laser application is so high that at the required concentration the penetration depth of the exciting light or radiation is usually less than $10^{-2}$ cm. over the useful excitation band. This means that in a candidate lanthanide chelate sample with a diameter greater than 0.1 cm. the bulk of the material is not excited.

Another drawback of the application of most lanthanide chelates to laser development was that the operation of these lanthanide chelates was restricted to low temperatures, about 125° K., due to the low fluorescence efficiency of the previously known lanthanide chelates at room temperature. In addition photodissociation and the production of refractive index gradients went against the attainment of stimulated emission at room temperatures.

Accordingly, it is an object of this invention to provide improved fluorescent lanthanide-containing compositions.

Another object of this invention is to provide chelated lanthanide ion-containing compositions having improved fluorescence.

Still another object of this invention in accordance with one embodiment thereof is to provide a method of producing lanthanide-containing compositions having improved fluorescence.

Still another object of this invention is to provide a method of preparing improved fluorescent materials.

Yet another object of this invention is to provide a method of generating fluorescence.

How these and other objects of this invention are accomplished will become apparent in the light of the accompanying disclosure. In at least one embodiment of the practice of this invention at least one of the foregoing objects will be achieved.

In accordance with this invention it has been discovered that a lanthanide chelate of dibenzoylamine (dibenzoylamine is intended throughout this specification and the claims to mean

or

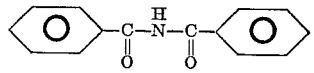

and can be ordered from K & K Laboratories, Plainview, New York, by reference to K & K catalog for "Rare Chemicals Fine," No. 4, 1961, p. 37) wherein the lanthanide component of said chelate is selected from the group consisting of terbium, europium, samarium and dysprosium, exhibits improved fluorescence, particularly improved fluorescence at about room temperature. Specifically, a lanthanide chelate selected from the group consisting of terbium, europium, samarium and dysprosium chelates wherein the ligand portion of said chelate is derivable from dibenzoylamine, such as terbium tris-dibenzoylamine, europium tris-dibenzoylamine, samarium tris-dibenzoylamine and dysprosium tris-dibenzoylamine, does not exhibit high absorptivity, such as in or near the ultraviolet range, and as a result in laser application greater volumes of materials containing such special lanthanide dibenzoylamine chelates can be pumped. Further, because these special chelates do not exhibit a high absorption coefficient, thermal effects are minimized since the amount of energy to be dissipated per unit volume for a given pump power is smaller.

The absorption depth for a 0.05 molar solution of europium tris-dibenzoylamine $[Eu(DBA)_3]$ is shown for several excitation frequencies in accompanying Table I.

TABLE I.—ABSORPTION OF A 0.05 M SOLUTION OF $Eu(DBA)_3$ IN TRI-N-BUTYL PHOSPHATE

| $m\mu$ | $\epsilon_{10}$ | Absorption depth $(\epsilon 10\ C)^{-1}$ cm. |
|---|---|---|
| 360 | 85 | 0.235 |
| 365 | 45 | 2.445 |
| 370 | 22 | 0.91 |
| 375 | 10 | 2.00 |
| 380 | 4.5 | 4.45 |

As disclosed in my copending patent application, Ser. No. 364,022, filed Apr. 30, 1964, the disclosures of which are herein incorporated and made part of this disclosure, the special lanthanide chelates of dibenzoylamine of this invention possess a high efficiency of sensitized fluorescence in the presence of Lewis bases. Accompanying Table II shows the lifetimes and approximate fluorescence yields of the dibenzoylamine complexes or chelates of trivalent terbium, europium, samarium and dysprosium.

TABLE II.—FLUORESCENCE LIFETIMES AND APPROXIMATE YIELDS OF SOME LANTHANIDE CHELATES OF DIBENZOYLAMINE

| Chelate | Solvent and Concentration | Msec. $\tau$ 77° K. | Msec. $\tau$ 300° K. | Yield, 300° K. |
|---|---|---|---|---|
| Tb(DBA)$_3$ | Crystalline | 1.31 | 1.16 | |
| Tb(DBA)$_3$ | 0.2 M in DMSO | 1.30 | 0.85 | ~0.5 |
| Tb(DBA)$_3$ | 0.2 M in TBP | 1.30 | 1.30 | >0.5 |
| Eu(DBA)$_3$ | 0.2 M in TBP | 1.15 | 1.09 | >0.5 |
| Eu(DBA)$_3$ | 0.2 M in DMSO | 0.93 | 1.15 | >0.5 |
| Sm(DBA)$_3$ | 0.05 M in TBP | | 0.080 | |
| Dy(DBA)$_3$ | 0.05 M in TBP | | 0.057 | |

DMSO is dimethylsulfoxide.
TBP is tri-n-butyl phosphate.

These lifetimes are longer than those reported in the literature for other lanthanide chelates and the temperature coefficients of the special lanthanide chelates of dibenzoylamine of this invention are very low, thereby indicating very little thermal quenching. One explanation is as follows. Since the excited energy levels of the ligand (the dibenzoylamine component) are so high they interact mainly with the higher lanthanide ion levels and very little with the emissive ones. As a consequence the oscillator strengths of the electronic transitions between the ground levels and the emissive levels are not increased over the same values in the absence of chelation to the same extent as in the previously known lanthanide chelates in which the perturbation of the lanthanide ion emissive levels by the ligand is stronger, hence, the longer radiative lifetimes and the absence of fluorescence yields for dysprosium and samarium, these are due to intraionic quenching. It is however, pointed out that in all four chelates listed in Table II the additional coordination afforded by tri-n-butyl phosphate (TBP) and dimethylsulfoxide (DMSO) reduces the quenching interactions between the rare earth ions and the solvent. The high fluorescence efficiency of the terbium and europium chelates of dibenzoylamine coupled with the relatively low absorption coefficient of dibenzoylamine in the near ultra-violet range indicates that these chelates and materials containing these chelates are useful in laser research and development.

Concerning the preparation of the lanthanide chelates of dibenzoylamine and compositions containing the same, various techniques may be employed. In accordance with one technique of the practice of this invention the lanthanide acetate, such as terbium acetate, was ground in a mortar with a stoichiometric amount of dibenzoylamine and the resulting admixture heated in an oven at a temperature of about 130° C. for about 3 hours. The resulting heated admixture crystallized upon cooling. When this material was dissolved in a suitable solvent, preferably together with a Lewis base, or in a solvent which is also a Lewis base (a Lewis base may be defined as a compound which can donate an electron pair or a compound having an unshared electron pair) e.g. tri-n-butyl phosphate and dimethylsulfoxide, the resulting solution exhibited fluorescence. Substantially the same spectroscopic properties were observed in a composition obtained by heating the same lanthanide acetate together with dibenzoylamine in the presence of the same solvent and Lewis base to effect dissolution of the solids. Accordingly, compositions in accordance with this invention exhibiting improved or enhanced fluorescence can be prepared by incorporating a lanthanide acetate and dibenzoylamine, preferably, together with a selected Lewis base, in a solvent or a suitable carrier, such as for example a liquid, solid or glassy carrier, such as an alcohol or other organic solvent, an epoxy resin or an acrylic plastic, to produce the special lanthanide chelates of this invention which exhibit improved fluorescence, these special lanthanide chelates being terbium tris-dibenzoylamine, europium tris-dibenzoylamine, samarium tris-dibenzoylamine and dysprosium tris-dibenzoylamine.

The enhanced fluorescence of the special lanthanide chelates of this invention is observable upon excitation of the compositions with ultra-violet light.

As will be apparent to those skilled in the art in the light of the foregoing disclosure, many substitutions and modifications are possible in the practice of this invention without departing from the spirit or scope thereof.

I claim:
1. A fluorescent composition consisting essentially of a lanthanide chelate of dibenzoylamine wherein the lanthanide component of said chelate is selected from the group consisting of terbium, europium, samarium and dysprosium.
2. A fluorescent composition consisting essentially of terbium tris-dibenzoylamine.
3. A fluorescent composition consisting essentially of europium tris-dibenzoylamine.
4. A fluorescent composition consisting essentially of samarium tris-dibenzoylamine.
5. A fluorescent composition consisting essentially of dysprosium tris-dibenzoylamine.
6. A fluorescent composition consisting essentially of an admixture of lanthanide chelates of dibenzoylamine wherein the lanthanide components of said chelates making up said admixture are selected from the group consisting of terbium, europium, samarium and dysprosium.
7. A fluorescent composition consisting essentially of a lanthanide chelate as set forth in claim 1 together with a liquid carrier for said chelate.
8. A fluorescent composition in accordance with claim 7 wherein said liquid carrier is a solvent for the lanthanide chelate.
9. A fluorescent composition consisting essentially of a lanthanide chelate as set forth in claim 1 together with a solid carrier for said chelate.
10. A fluorescent composition in accordance with claim 9 wherein said solid carrier is a solid glassy material.

References Cited
UNITED STATES PATENTS 3,225,307  12/1965  Weissman _____ 252—301.2

OTHER REFERENCES

Kleinerman et al.: Enhancement of Fluorescence Yield of Chelated Lanthanide Ions by Lewis Bases—Journal of Chemical Physics, vol. 41, No. 12, Dec. 15, 1964, pp. 4009–10.

TOBIAS E. LEVOW, Primary Examiner.

R. A. EDMONDS, Assistant Examiner.

U.S. Cl. X.R.

260—429.2; 331—94.5